(12) United States Patent
Vaquero Gonzalez et al.

(10) Patent No.: US 10,671,668 B2
(45) Date of Patent: Jun. 2, 2020

(54) INFERRING GRAPH TOPOLOGIES

(71) Applicant: HEWLETT PACKARD ENTERPRISE DEVELOPMENT LP, Houston, TX (US)

(72) Inventors: Luis Miguel Vaquero Gonzalez, Bristol (GB); Marco Aurelio Barbosa Fagnani Gomes Lotz, Bristol (GB); Brian Quentin Monahan, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 544 days.

(21) Appl. No.: 15/206,637

(22) Filed: Jul. 11, 2016

(65) Prior Publication Data

US 2018/0011945 A1     Jan. 11, 2018

(51) Int. Cl.
*G06F 16/901*    (2019.01)
*G06F 16/22*     (2019.01)
*G06F 16/248*    (2019.01)

(52) U.S. Cl.
CPC ........ *G06F 16/9024* (2019.01); *G06F 16/221* (2019.01); *G06F 16/248* (2019.01)

(58) Field of Classification Search
CPC ......... G06F 17/30958; G06F 17/30554; G06F 17/30315; G06F 16/9024; G06F 16/248; G06F 16/221
USPC ........................................ 707/722, 798, 797
See application file for complete search history.

(56) References Cited

U.S. PATENT DOCUMENTS

| 8,565,124 | B2 * | 10/2013 | Umayabashi | H04L 45/48 370/255 |
| 9,031,981 | B1 | 5/2015 | Potter et al. | |
| 9,053,210 | B2 | 6/2015 | Elnikety et al. | |
| 10,339,179 | B2 * | 7/2019 | Yousfi | G06F 16/25 |
| 10,528,958 | B2 * | 1/2020 | Yang | G06F 16/9024 |
| 2008/0165705 | A1 * | 7/2008 | Umayabashi | H04L 12/462 370/256 |
| 2014/0108322 | A1 | 4/2014 | Buchanan et al. | |
| 2015/0026158 | A1 | 1/2015 | Jin | |

(Continued)

OTHER PUBLICATIONS

Zhang, M., et al., Automatic Discovery of Attributes in Relational Databases, SIGMOD '11, Jun. 12-16, 2011, pp. 109-120.

(Continued)

*Primary Examiner* — Phong H Nguyen
(74) *Attorney, Agent, or Firm* — Hewlett Packard Enterprise Patent Department

(57) ABSTRACT

Example embodiments relates to method and systems to infer graph topologies. A computing device for inferring a graph topology, comprises a physical processor that executes machine readable instructions that cause the computing device to process a set of unclassified tables. For each table the computing device determines a primary key comprising a set of columns of a table being analyzed, determines a set of foreign keys, each foreign key comprising a column of the analyzed table, and identifies a parameter based on the analyzed table, the primary key and the set of foreign keys. The parameter may comprise a node identification, a set of node attributes, a set of edges without attributes, a set of edges with attributes or a set of edge attributes. The computing device can cause the display of the graph topology based on the processed set of unclassified tables.

11 Claims, 10 Drawing Sheets

(56) References Cited

U.S. PATENT DOCUMENTS

| | | | | |
|---|---|---|---|---|
| 2015/0120775 A1* | 4/2015 | Shao | ............... | G06F 16/2456 |
| | | | | 707/769 |
| 2017/0053294 A1* | 2/2017 | Yang | ............... | G06F 16/9024 |
| 2017/0293697 A1* | 10/2017 | Youshi | ............... | G06F 16/9024 |
| 2019/0286662 A1* | 9/2019 | Yousfi | ............... | G06F 16/90335 |

OTHER PUBLICATIONS

Yoo et al., "RDB2Graph: A Generic Framework for Modeling Relational Databases as Graphs", 4th Joint International Semantic Technology (JIST2014) conference, 2014, 4 pages.

Xirogiannopoulos et al., "GraphGen: Exploring Interesting Graphs in Relational Data", Proceedings of the 41st International Conference on Very Large Data Bases, vol. 8, Issue 12, Aug. 2015, pp. 2032-2035.

Virgilio et al., "R2G: A Tool for Migrating Relations to Graphs", published in Proceedings of the 17th international Conference on Extending Database Technology (EDBT 2014), pp. 640-643.

Virgilio et al., "Model-Driven Design of Graph Databases", Conceptual Modeling, ER 2014, pp. 172-185.

Virgilio et al., "Converting Relational to Graph Databases", First International Workshop on Graph Data Management Experience and Systems (GRADES 2013), Jun. 23, 2013, 6 pages.

Perez et al., "Ringo: Interactive Graph Analytics on Big-Memory Machines", SIGMOD 2015, Proceedings of the 2015 ACM SIGMOD, International Conference on Management of Data, 6 pages.

Lee et al., "Table2Graph: A Scalable Graph Construction From Relational Tables Using Map-Reduce", 2015, 8 pages.

Graph Base, "RapidGrapher for Agility", available online at <https://web.archive.org/web/20130706052837/http://graphbase.net/GBaseRapidGrapher.html>, Jul. 6, 2013, 1 page.

\* cited by examiner

INFERRING GRAPH TOPOLOGIES

BACKGROUND

Graph topologies can be processed by taking use of tools, libraries and frameworks. The process of creating a graph topology from data in different format or even with no format at all (unstructured data) may be highly complex and time consuming.

BRIEF DESCRIPTION OF THE DRAWINGS

FIG. 4 3 is a block diagram of example instructions to identify node attributes associated with a graph.

DETAILED DESCRIPTION

Figure 1:
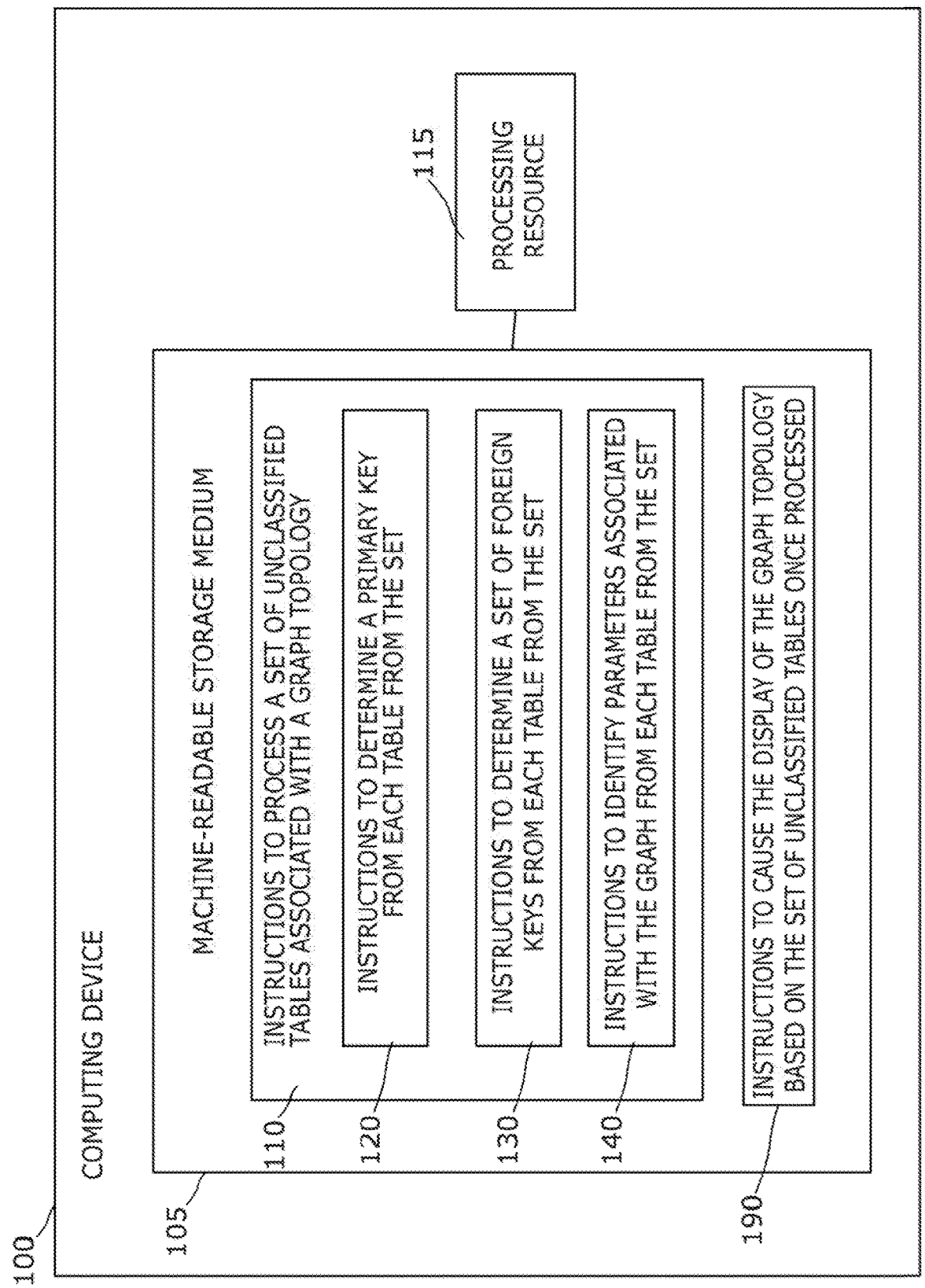
FIG. 1 is a block diagram of an example computing device for inferring a graph topology.

A graph topology can be a representation that can comprise nodes that can be represented by distinct points and edges that can be represented by arcs joining a corresponding pairs of points. Hence, the points may represent the nodes of a graph and the arcs may represent its edges.

The present disclosure can take use of a form of highly structured data specified as relational data in relational databases. Relational databases can organize data into a regular tabular row and column structure also specified as relational schema. In this relational schema, tasks can be processed by performing structural relational operations that may comprise select, project and several types of relational joins, among others. The mentioned tasks may have a regular form embodied in the Standard Query Language (SQL). Relational databases and graph-oriented databases can be both based upon relations between data and could comprise similar type of data. Hence, the present disclosure can rely on a relational schema available in any relational database system to infer a graph topology that can be enriched with edge attributes.

Systems dealing with converting relational data into graph topologies rely on user input to extract a graph topology from tables in a database. The extracted topology can represent a barebones graph comprising a list of vertex and their connections. It is technically challenging to infer a graph topology enriched with information inferred from a database. To that end, few systems implement a sort of very basic inference that heavily relies on a specific relational schema. These systems cannot create a graph topology by inferring information from relational databases.

The disclosed technical solution relies on inferring a graph topology by dynamically inspecting the database schema without making any assumption on the structure of the tables of the database. Graph topologies can also be inferred by applying the solution described in the present disclosure. The disclosed solution utilizes edge attributes as they require users to indicate the mapping between a table column and an edge attribute. A first type of edge called edge without attributes can be inferred from a column in a table in the database. A second type of edge called edge with attributes can be inferred from two columns in a table in the database. An edge can be an entity that links tables within the database. Examples of edge attributes are data associated with edges: most commonly edge weights, or visualization parameters. An edge attribute can be inferred from a column in a table or other information associated with an entity that links tables in the database. The present disclosure proposes a solution that solves the aforementioned technical problem as it can infer edge attributes in the process of graph topology extraction from relational data.

In an example according to the present disclosure, a computing device for inferring a graph topology may comprise a physical processor. The physical processor of the computing device may execute instructions on a machine-readable storage medium for inferring a graph topology. Each table from a set of unclassified tables according to a relational schema can be processed by the physical processor. The physical processor may execute instructions to process the set of unclassified tables and these instructions may comprise instructions to determine a primary key comprising a set of columns of a table being processed, determine a set of foreign keys, each foreign key comprising a column of the processed table. The physical processor may further execute instructions to identify a parameter based on the processed table, the primary key and the set of foreign keys. The parameter may comprise a node identification, a set of node attributes, a set of edges without attributes, a set of edges with attributes or a set of edge attributes. The physical processor may further execute instructions to cause the display of the graph topology based on the processed set of unclassified tables.

In some examples, the physical processor may execute machine readable instructions that cause the computing device to responsive to the primary key comprising a single column which does not comprise a time stamp, identify the single column as the node identification and responsive to the primary key comprising two columns and one of the columns comprising the time stamp, identify the column which does not comprise the time stamp as the node identification. The physical processor may execute machine readable instructions that cause the computing device to responsive to node identification being identified, identify a set of columns of the processed table as the set of node attributes, wherein the set of columns of the processed table do not comprise the primary key or the set of foreign keys.

In some examples, the physical processor may execute machine readable instructions that cause the computing device responsive to the primary key comprising a single column, identify the set of foreign keys as the set of edges without attributes and for each foreign key, the physical processor may execute machine readable instructions that cause the computing device to determine from the processed table a source of an edge without attributes and determine from a further table associated with the a set of foreign keys a destination of the edge without attributes.

In some examples, the physical processor may execute machine readable instructions that cause the computing device to responsive to the primary key comprising more than one column determine a set of pairs of foreign keys based on the set of foreign keys, identify the set of pairs of foreign keys as the set of edges with attributes and identify additional columns of the processed table as the set of edge attributes, wherein the additional columns do not comprise the primary key or the set of foreign keys. In some examples, for each pair of foreign keys the physical processor may execute machine readable instructions that cause the computing device to determine a first key of a pair of foreign keys a source of an edge with attributes and determine a second key of the pair of foreign keys a destination of the edge with attributes.

In another example according to the present disclosure, it is described a method being implemented by a computing device comprising a physical processor executing machine readable instructions. The method may comprise analyzing a set of unclassified tables and for each table the method may comprise obtaining a primary key, the primary key representing a set of columns of an unclassified table from the set of unclassified tables, obtaining a set of foreign keys, each foreign key representing a column of the unclassified table and identifying a parameter based on the unclassified table, the primary key and the set of foreign keys. The parameter may comprise a node identification, a set of node attributes, a set of edges without attributes, a set of edges with attributes, or a set of edge attributes. The method may further comprise causing the display of the graph topology based on the analyzed set of unclassified tables.

In some examples, the method may further comprise responsive to the primary key comprising a single column which does not comprise a time stamp, identifying the single column as the node identification and responsive to the primary key comprising two columns and one of the columns comprising the time stamp, identifying the column which does not comprise the time stamp as the node identification. In some examples, the method may further comprise responsive to node identification being identified, identifying a set of columns of the unclassified table as the set of node attributes, wherein the set of columns of the unclassified table do not comprise the primary key or the set of foreign keys.

In some examples, the method may further comprise responsive to the primary key comprising a single column, identifying the set of foreign keys as the set of edges without attributes. For each foreign key, the method may further comprise determining from the unclassified table a source of an edge without attributes and determining from a further table associated with the set of foreign keys a destination of the edge without attributes.

In some examples, the method may further comprise responsive to the primary key comprising more than one column determining a set of pairs of foreign keys based on the set of foreign keys, identifying the set of pairs of foreign keys as the set of edges with attributes and identifying additional columns of the table as the set of edge attributes, wherein the additional columns of the table do not comprise the primary key or the set of foreign keys. For each pair of foreign keys the method may comprise determining a first key of a pair of foreign keys a source of an edge with attributes and determining a second key of the pair of foreign keys a destination of the edge with attributes.

In an example according to the present disclosure a non-transitory machine-readable storage medium may be encoded with instructions to infer a graph topology. The non-transitory machine-readable storage medium may comprise instructions to process of a set of unclassified tables and for each table specify a primary key based on a set of columns of an unclassified table, specify a set of foreign keys, each key comprising a column of the unclassified table and identify a parameter based on the unclassified table, the primary key and the set of foreign keys, the parameter comprising a node identification, a set of node attributes, a set of edges without attributes, a set of edges with attributes or a set of edge attributes. The non-transitory machine-readable storage medium may further comprise instructions to cause the display of the graph topology based on the processed set of unclassified tables.

In some examples, the non-transitory machine-readable storage medium may be encoded with instructions to responsive to the primary key comprising a single column which does not comprise a time stamp, identify the single column as the node identification and responsive to the primary key comprising two columns and one of the columns comprising the time stamp, identify the column which does not comprise the time stamp as the node identification. The non-transitory machine-readable storage medium may be further encoded with instructions to responsive to node identification being identified, identify a set of columns of the unclassified table as the set of node attributes, wherein the set of columns of the unclassified table do not comprise the primary key or the set of foreign keys.

In some examples, the non-transitory machine-readable storage medium may be encoded with instructions to responsive to the primary key comprising a single column, identify the set of foreign keys as the set of edges without attributes. For each foreign key non-transitory machine-readable storage medium may be encoded with instructions to determine from the unclassified table a source of an edge without attributes and determine from a further table related to the foreign key a destination of the edge without attributes.

In some examples, the non-transitory machine-readable storage medium may be encoded with instructions to responsive to the primary key comprising more than one column, determine a set of pairs of foreign keys based on the set of foreign keys, identify the set of pairs of foreign keys as the set of edges with attributes and identify additional columns of the table as the set of edge attributes, wherein the additional columns of the table do not comprise the primary key or the set of foreign keys. For each pair of foreign keys the non-transitory machine-readable storage medium may be encoded with instructions to determine a first key of a pair of foreign keys a source of an edge with attributes and determine a second key of the pair of foreign keys a destination of the edge with attributes.

Referring now to the drawings, FIG. 1 shows an example of a computing device 100 for inferring a graph topology. The computing device 100 may be, for example, a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or internet network, that perform the functions described herein. In the example shown in FIG. 1, system 100 includes a processing resource 115 and a non-transitory machine-readable storage medium 105 encoded with instructions to infer graph topologies.

The processing resource 115 may be one or more central processing units (CPUs), semiconductor-based microprocessors, and/or other hardware devices suitable for retrieval and execution of instructions stored in a machine-readable storage medium 105. The processing resource 115 may fetch, decode, and execute instructions 110, 120, 130, 140 and 190 and/or other instructions to implement the procedures described herein. As an alternative or in addition to retrieving and executing instructions, the processing resource 115 may include one or more electronic circuits that include electronic components for performing the functionality of one or more of instructions 110, 120, 130, 140 and 190.

In an example, the program instructions 110, 120, 130, 140 and 190, and/or other instructions can be part of an installation package that can be executed by the processing resource 115 to implement the functionality described herein. In such a case, the machine-readable storage medium 105 may be a portable medium such as a CD, DVD, or flash drive or a memory maintained by a computing device from which the installation package can be downloaded and installed. In another example, the program instructions may be part of an application or applications already installed on the computing device 100.

The machine-readable storage medium 105 may be any electronic, magnetic, optical, or other physical storage device that contains or stores executable data accessible to the computing device 100. Thus, the machine-readable storage medium 105 may be, for example, a Random Access Memory (RAM), an Electrically Erasable Programmable Read-Only Memory (EEPROM), a storage device, an optical disc, and the like. The machine-readable storage medium 105 may be a non-transitory storage medium, where the term "non-transitory" does not encompass transitory propagating signals. The machine-readable storage medium 105 may be located in the computing device 100 and/or in another device in communication with the computing device 100. As described in detail below, the machine-readable storage medium 105 may be encoded with instructions 110 to process a set of unclassified tables associated with a graph topology, instructions 120 to determine a primary key from each table from the set, instructions 130 to determine a set of foreign keys from each table from the set, instructions 140 to identify parameters associated with the graph topology from each table from the set and instructions 190 to cause the display of the graph topology based on the set of unclassified tables once processed. The term set in the present disclosure refers to one or more elements. An unclassified table can be a table whose content may not be classified yet as content related to a node or an edge or both by performing the solution described in the present disclosure. After the content of an unclassified table can be processed by the solution described in the present disclosure, this table can be classified as a node table or an edge table or both. The set of unclassified tables may comprise all the tables found in a predetermined relational schema available in a particular relational database management system. The set of unclassified tables may be modeled as an unordered set of tables.

For each of the tables from the set of unclassified tables, the primary key of a table can comprise one or more columns of the table and the set of foreign keys may comprise one or more foreign keys, where each of the foreign keys can comprise a single column of the same table.

Figure 3:
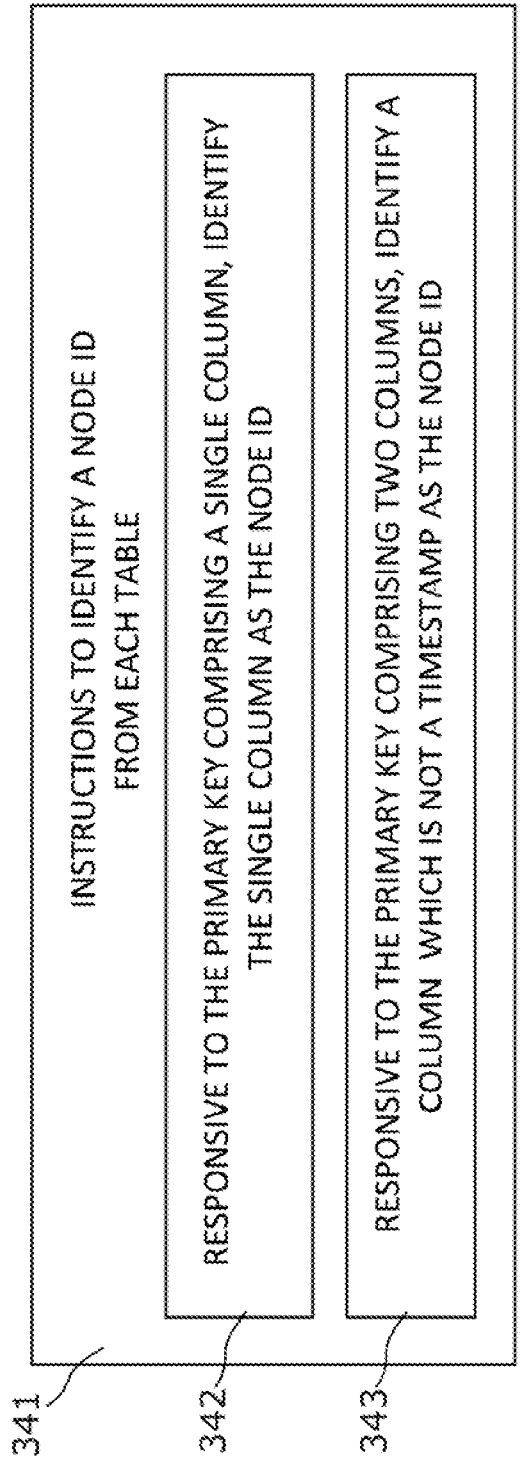
FIG. 3 is a block diagram of example instructions to identify a node identification (ID) associated with a graph.

The instructions 110 to process a set of unclassified tables associated with a graph topology may comprise the instructions 120 to determine a primary key from each table from the set, the instructions 130 to determine a set of foreign keys from each table from the set and the instructions 140 to identify parameters associated with the graph topology from each table from the set. The instructions 110 can be executed to each table from the set of unclassified tables. Each table from the set may be processed by the instructions 120, 130 and 140. The computing device described in the present disclosure can be configured to process tables related to any type of relational database management system. Instructions 120 can determine the primary key from each table from the set of unclassified tables. The primary key can be used to uniquely identify a row in a table from the set of tables. Two rows from the table cannot have the same primary key. Columns comprising identification numbers can be often used as primary keys. Any field that is not necessarily unique, such as e.g. a person's name should not be suitable for being a primary key. By determining the primary key of a table, a node ID from the same table could be inferred by identifying the primary key of the table as the node ID, where this node ID should be unique between nodes of the same type. By determining the node ID, the table can be related to unique node of a specific type. The node type can be the column comprising the node ID. The primary key may be determined by parsing the relational schema provided by e.g. Data Description Language (DLL) and then selecting one or more columns from the table. FIG. 3 describes how to identify the node ID.

Figure 5:
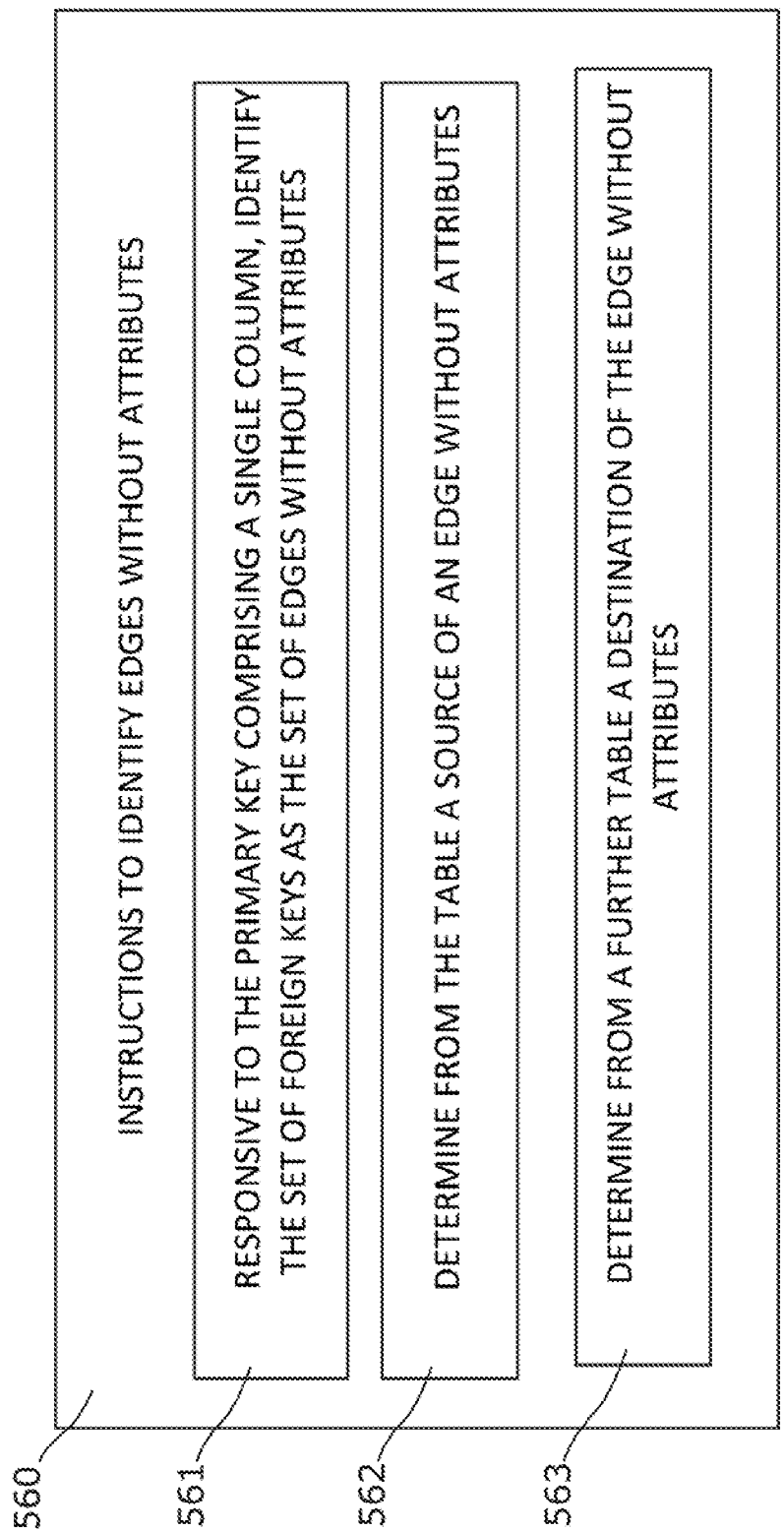
FIG. 5 is a block diagram of example instructions to identify edges without attributes associated with a graph.
Figure 6:
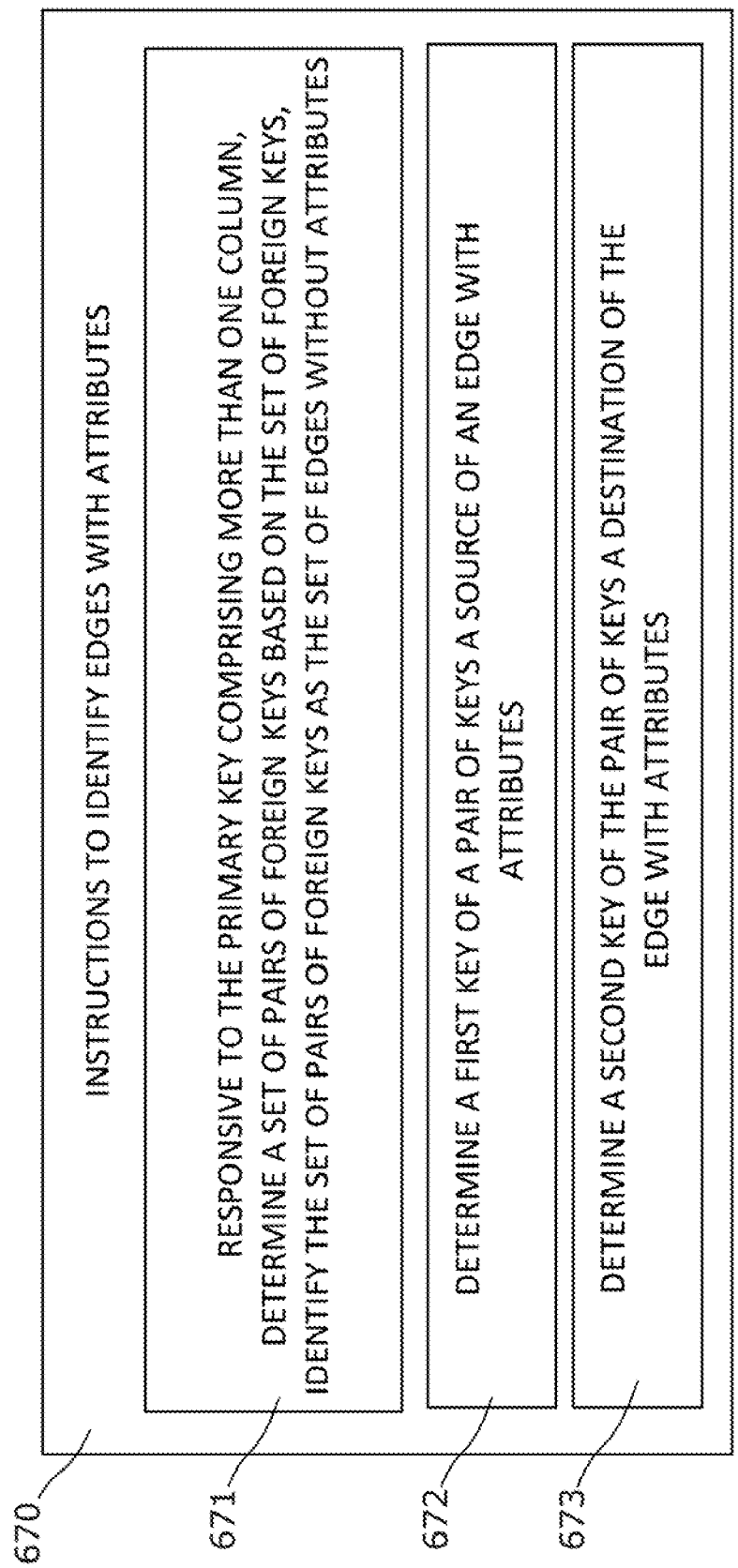
FIG. 6 is a block diagram of example instructions to identify edges with attributes associated with a graph.

Instructions 130 can determine a set of foreign keys from each table from the set of unclassified tables. A first foreign key can be a field (or collection of fields) from a first table that can uniquely identify a row from a further table. A second foreign key can be defined in the further table and can refer to the first table. The foreign keys can be a clear association between two tables from the set of unclassified tables and they can be an indicative of possible edges. Instructions 130 can determine the set of foreign keys by inspecting the syntax of the relational schema provided by e.g. the DLL and then selecting one or more columns from the table according to this relational schema. FIG. 5 and FIG. 6 describes how to identify edges according to the proposed solution.

Inferring the graph topology can be achieved by performing instructions 190 that can cause the display of the graph topology once the set of unclassified tables have been processed by instructions 120, 130 and 140. Instructions 190 may further comprise instructions to store the graph topology and instructions to transmit the graph topology, where the instructions to transmit the graph topology can comprise instructions to transmit the graph topology via a network to a remote system with capabilities to process the graph topology. The graph can comprise nodes that can be displayed by distinct points. Each of these points can represent a node ID with associated node attributes. Information about the node attributes can be displayed adjacent to the points. The graph can further comprise edges that can be displayed by arcs joining a pairs of points. Each of these arcs (i.e. the edges) may have associated edge attributes that can be displayed adjacent to the arcs. Node and edge attributes can be data associated with nodes and edges, respectively.

Figure 2:
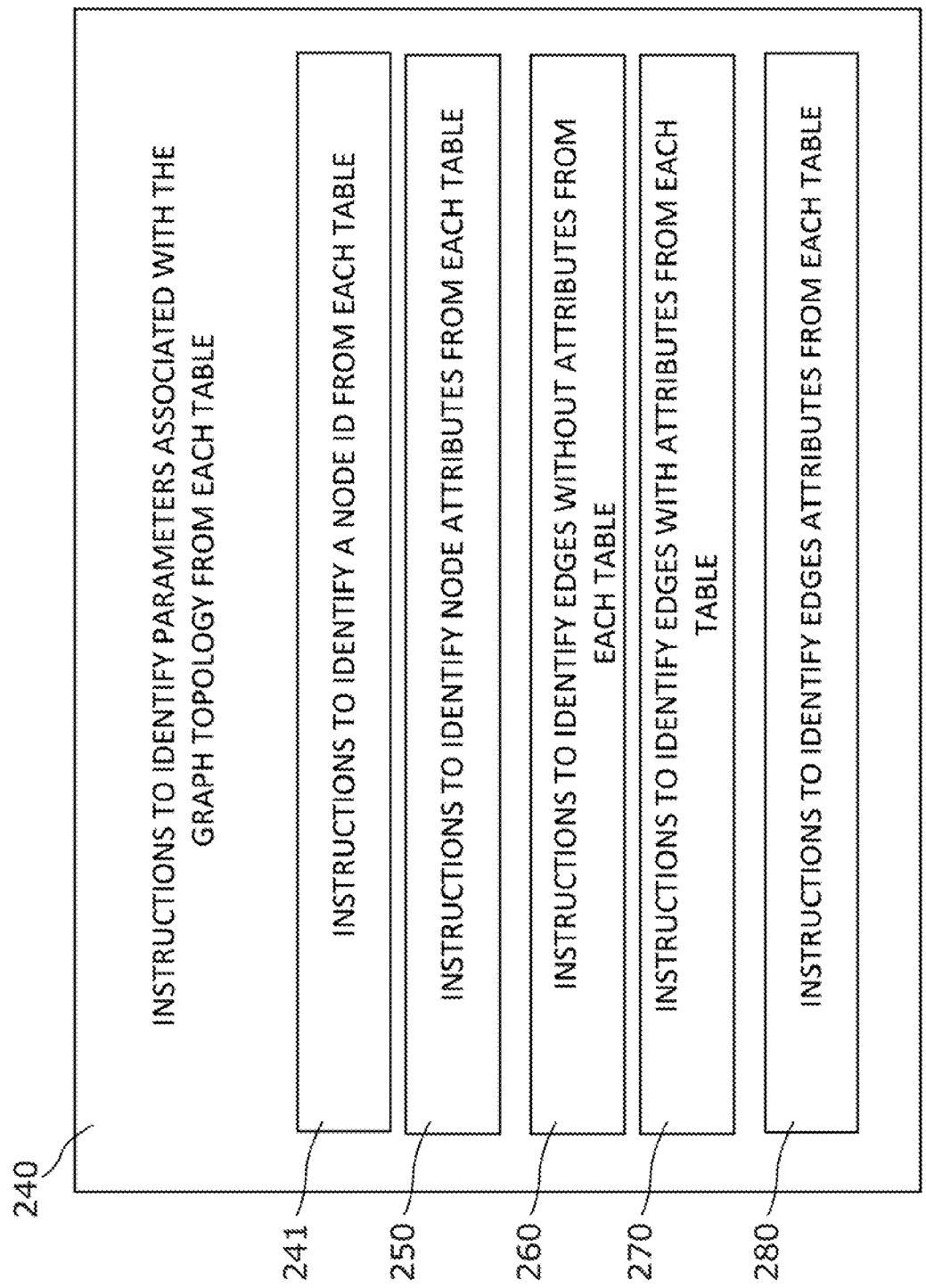
FIG. 2 is a block diagram of example instructions to identify parameters associated with a graph.

FIG. 2 shows instructions 240 to identify parameters associated with the graph topology from each table. The instructions 240 can correspond to instructions 140 from FIG. 1. As mentioned above, parameters may comprise a node identification, a set of node attributes, a set of edges without attributes, a set of edges with attributes or a set of edge attributes. The instructions 240 can be applied to each the table from the set of unclassified tables. The instructions 240 can comprise instructions that can be sequentially applied to each table from the set of unclassified tables as shown in FIG. 2. Some of the instructions 240 may be implemented before instructions 190 to cause the display of the graph topology described in FIG. 1. According to an example of the present disclosure, the instructions 240 can comprise instructions 241 to identify a node ID from each table from the set of unclassified tables, instructions 250 to identify a set of node attributes from each table, where the set of node attributes may comprise one or more node attributes. The instructions 240 can further comprise instructions 260 to identify edges without attributes from each table from the set of unclassified tables, instructions 270 to identify edges with attributes from each table and instructions 280 to identify edges attributes from each table. The following figures describe instructions 241, 250, 260, 270 and 280 in more detail.

FIG. 3 shows instructions 341 (corresponding to instructions 241 from FIG. 2) to identify a node ID from each table from the set of unclassified tables. Instructions 341 can be applied to each table from the set of unclassified tables. A table identified with a node ID can be classified as a node table. A node ID can be determined based on the primary key previously identified and based on the primary key complying with conditions described in instructions 341. The solution according to the present disclosure can classify a table as a node table if a node ID is identified from the table. A node table can be a table wherein all its content is related to node information. Hence, a node table is a table with an identified node ID. A node table can further comprise node attributes. A node table can be associated with a node of the graph topology. A table cannot be classified as a node table if a node ID is not identified from that table and therefore node information cannot inferred from that table, i.e. this table cannot contribute with nodes and node attributes to the graph. In this regard, this node can be part of the graph topology and can be used by a computing system to run a graph algorithm. Instructions 341 can comprise instructions that can be sequentially applied to each table from the set of unclassified tables. The primary key may not comply with the mentioned conditions described in instructions 341 causing that a table associated with the primary key may not being inferred.

According to an example of the present disclosure, the instructions 341 can comprise instructions 342 to, responsive to the primary key comprising a single column of a table being processed, identify the single column as the node ID. Alternatively, the instructions 341 can comprise instructions 343 to, responsive to the primary key comprising two columns and one of the two columns comprising a timestamp, identify a column which does not comprise a timestamp as the node ID. A timestamp column can depict time information as e.g. a logging event. Databases repositories can have tables with columns comprising timestamps. A column comprising a timestamp may not be relevant to the proposed solution for determining a node ID unless the primary key comprises a single column representing a time stamp according to instructions 342. Instructions 341 may not identify the node ID from a table if the primary key comprises more than two columns or if the primary key comprises two columns and one of the two columns not comprise a timestamp. If the node ID cannot be identified from a table, this table cannot be classified as a node table and a node cannot be inferred from that table.

Figure 4:
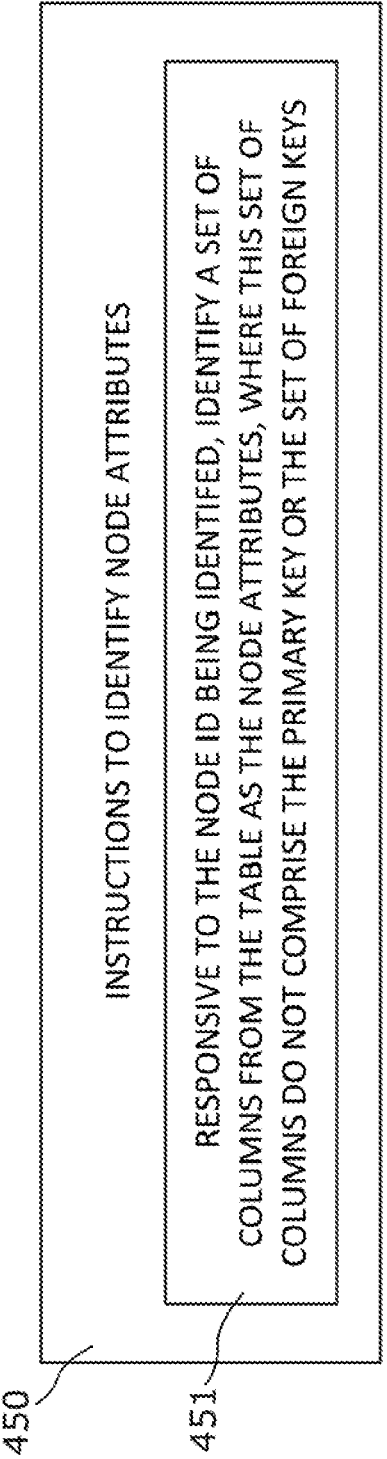

FIG. 4 shows instructions 450 (corresponding to instructions 250 from FIG. 2) to identify node attributes from each table from the set of unclassified tables. A node attribute can be a column from a table associated with an identified node from the same table, for example a node type "user" may have attributes "age", i.e. a column "age" containing numbers and "gender", i.e. a column "gender" containing "male" or "female". Instructions 450 can be applied to each table from the set of unclassified tables. According to an example of the present disclosure, the instructions 450 can comprise instructions 451 to, responsive to the node ID being identified, identify a set of columns from the table as the set of node attributes, where this set of columns do not comprise the primary key of the set of unclassified keys. The remaining columns of the node table that do not comprise the primary key or the set of foreign keys can be the node attributes upon classifying that table as a node table. Hence, instructions 451 of FIG. 4 can be applied after identifying the node ID by executing instructions 341 described in FIG. 3. The set of node attributes can be one or more node attributes, where each node attribute comprises a single column of the table being processed. Each of the columns of the node table may be identified as a single type of attribute for the node associated with the table.

FIG. 5 shows instructions 560 (corresponding to instructions 260 from FIG. 2) to identify one or more edges without attributes from each table from the set of unclassified tables. An edge without attributes can be represented in the graph topology by an arc beginning and ending in a node. Instructions 560 can be applied to each table from the set of unclassified tables. The solution according to the present disclosure can classify a table as an edge table if edges with attributes or edges without attributes are identified in the table and where these edges can be represented in the graph topology. In this regard, the identified edges from each table can be part of the graph topology and can be used e.g. by a computing system to run a graph algorithm.

Instructions 560 can comprise instructions that can be sequentially applied to each table from the set of unclassified tables. According to an example of the present disclosure, the instructions 560 can comprise instructions 561 to, responsive to the primary key comprising a single column of the table being processed, identify the set of foreign keys as the set of edges without attributes, where each edge without attributes can be related to a foreign key. Each edge without attributes may be determined by executing instructions 562 and 563. In particular, instructions 532 can comprise instructions to determine from the edge table a source of an edge without attributes and instructions 563 to determine from a further table that is a destination of the edge without attributes.

The source of the edge without attributes can be the edge table being processed and the destination of the edge without attributes can be the further table, where the further table can be obtained from the foreign key related to the edge without attributes. The further table may be a table from the set of unclassified tables and may be specified by the foreign key. In an example of the present disclosure, the edges without attributes may be undirected edges. An undirected edge can be defined as an edge with no orientation. Hence, an undirected edge does not have a direction assigned.

A self-edge can be a particular edge without attributes where the source of the edge and the destination of the edge can be the same table from the set of unclassified tables, i.e. the self-edge is an edge that can begin and end in a node of the same topological type. Nodes of the same topological type can be defined as nodes that share the same set of node attributes and the same node type name. For example, three nodes of topological type name "person" comprise node attributes name, age and height, hence these three nodes of type name "person" can be nodes of the same topological type.

Figure 7:
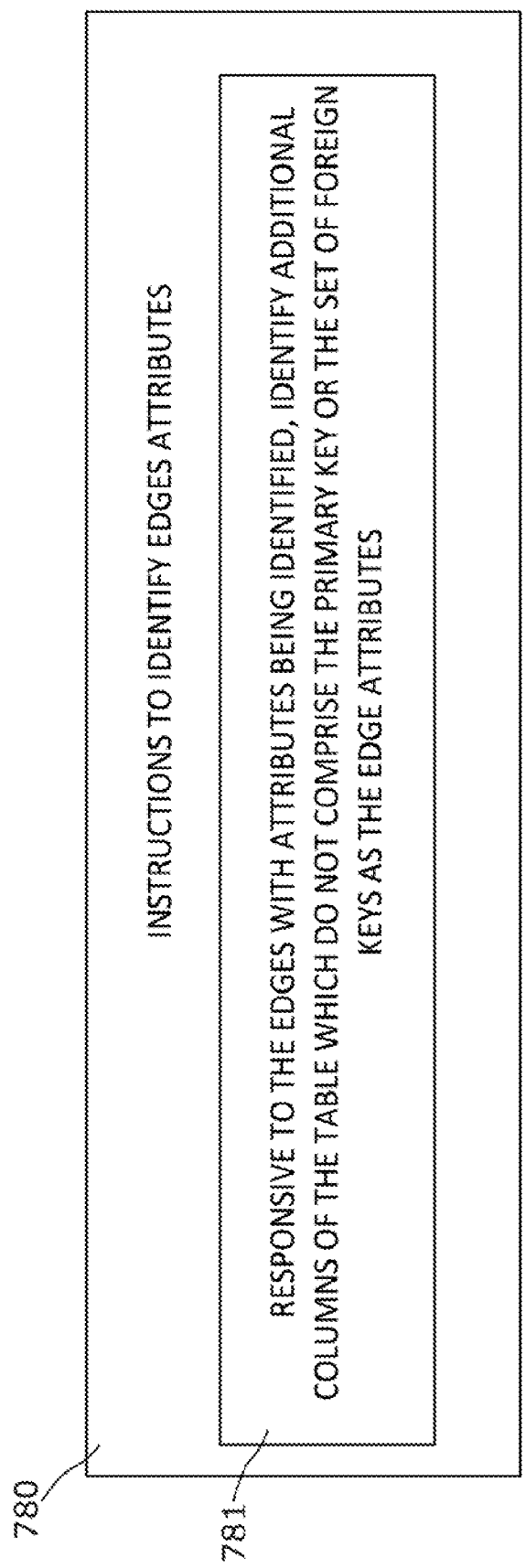
FIG. 7 is a block diagram of example instructions to identify edges attributes associated with a graph.

FIG. 6 shows instructions 670 (corresponding to instructions 270 of FIG. 2) to identify one or more edges with attributes from each table from the set of unclassified tables. An edge with attributes can be represented in the graph topology by an arc beginning and ending in a node with different topological type where this arc can have associated edge attributes. An edge with attributes my associated with two foreign keys determined in the same table. FIG. 7 describes how to identify edges attributes. Instructions 670 can be applied to each table from the set of unclassified tables. A table that has been identified with edges with attributes can be classified as an edge table similarly to a table that has been identified with edges without attributes. Instructions 670 can comprise instructions that can be sequentially applied to each table from the set of unclassified tables.

According to an example of the present disclosure, the instructions 670 can comprise instructions 671 to, responsive to the primary key comprising more than one column of the table being processed, determine a set of pairs of foreign keys based on the set of foreign keys and identify the set of pairs of foreign keys as the set of edges with attributes. As described in FIG. 5, responsive to the primary key comprising a single column, edges without attributes can be identified but not edges with attributes. The set of pairs of foreign keys can be a set of pairs that comprise all possible foreign key pair combinations from the set of foreign keys from the table being processed. The set of edges with attributes can be one or more edges with attributes, where each edge with attributes may be determined by executing instructions 672 and 673. In particular, instructions 670 can further comprise instructions 672 to determine a first key of a pair of keys as a source of an edge with attributes and instructions 673 to determine a second key of the pair of keys as a destination of the edge with attributes. According to the solution proposed in the present disclosure, the edges with attributes may be undirected edges.

FIG. 7 shows instructions 780 (corresponding to instructions 280 from FIG. 2) to identify a set of edge attributes from each table from the set of unclassified tables. An edge attribute can be a data associated with an edge, for example an edge "rented" may have attributes "date" and "price". Instructions 780 can be applied to each table from the set of unclassified tables. According to an example of the present disclosure, the instructions 780 can comprise instructions 781 to, responsive to the set of edges with attributes being identified and the table being classified as an edge table, identify a set of columns from the table as the set of edged attributes, where this set of columns do not comprise the primary key or the set of foreign keys. The remaining columns of the edge table that do not comprise the primary key or the set of foreign keys can be identified as the set of edge attributes upon classifying that table as an edge table. Each of the columns of the edge table may be identified as a single type of attribute for the edge associated with the table.

Hence, instructions 781 of FIG. 7 can be executed after the set of edges with attributes by applying instructions 670 described in FIG. 6. The set of edge attributes can be one or more edge attributes, where each edge attribute comprise a single column of the edge table being processed.

Figure 8:
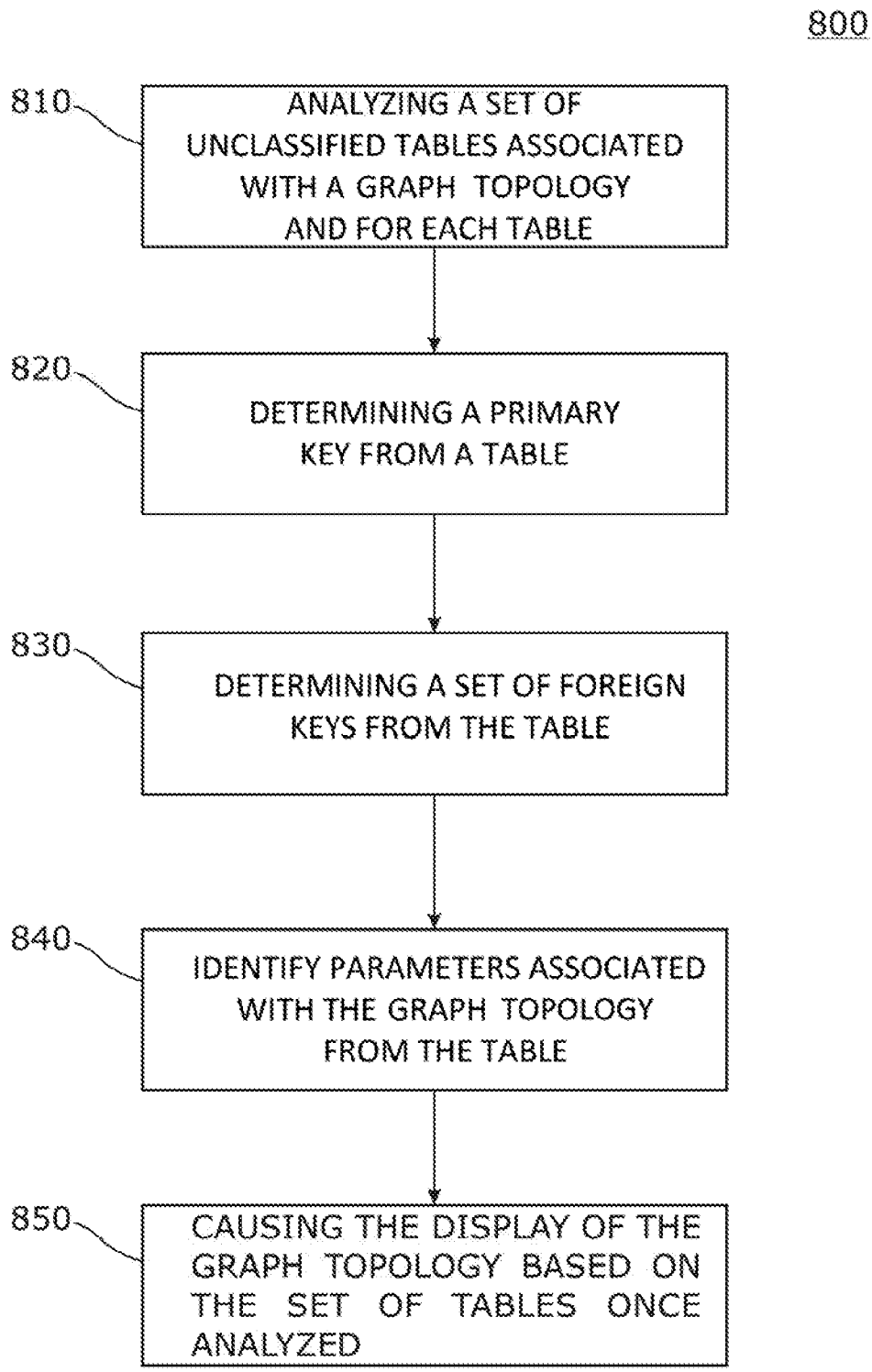
FIG. 8 is a flowchart of example blocks for inferring a graph topology.

FIG. 8 describes an example of a block diagram 800 for inferring a graph topology according to an example of the present disclosure. For example instructions 110 previously described in FIG. 1 may implement block 810 within the diagram 800 for analyzing a set of unclassified tables associated with a graph topology. Responsive to the set of tables being analyzed, the instructions 120 may implement block 820 for determining a primary key from a table being analyzed, where this table can be part of the set of unclassified tables. The instructions 130 may execute block 830 for determining a set of foreign keys from the table being analyzed and the instructions 140 may implement block 840 for identifying parameters associated with the graph topology from the table being analyzed and instructions 190 may implement block 890 for causing the display of the graph topology based on the set of unclassified tables once analyzed.

The relationship among nodes, edges and attributes and how the graph topology is displayed according to these elements has been described in FIG. 1. Inferring the graph topology can be achieved by performing instructions 190 that can implement block 890 and may further comprise instructions to transmit the graph topology, where the instructions to transmit the graph topology can comprise instructions to transmit the graph topology via a network to a remote system with capabilities to process the graph topology and instructions to store the graph topology.

Figure 9:
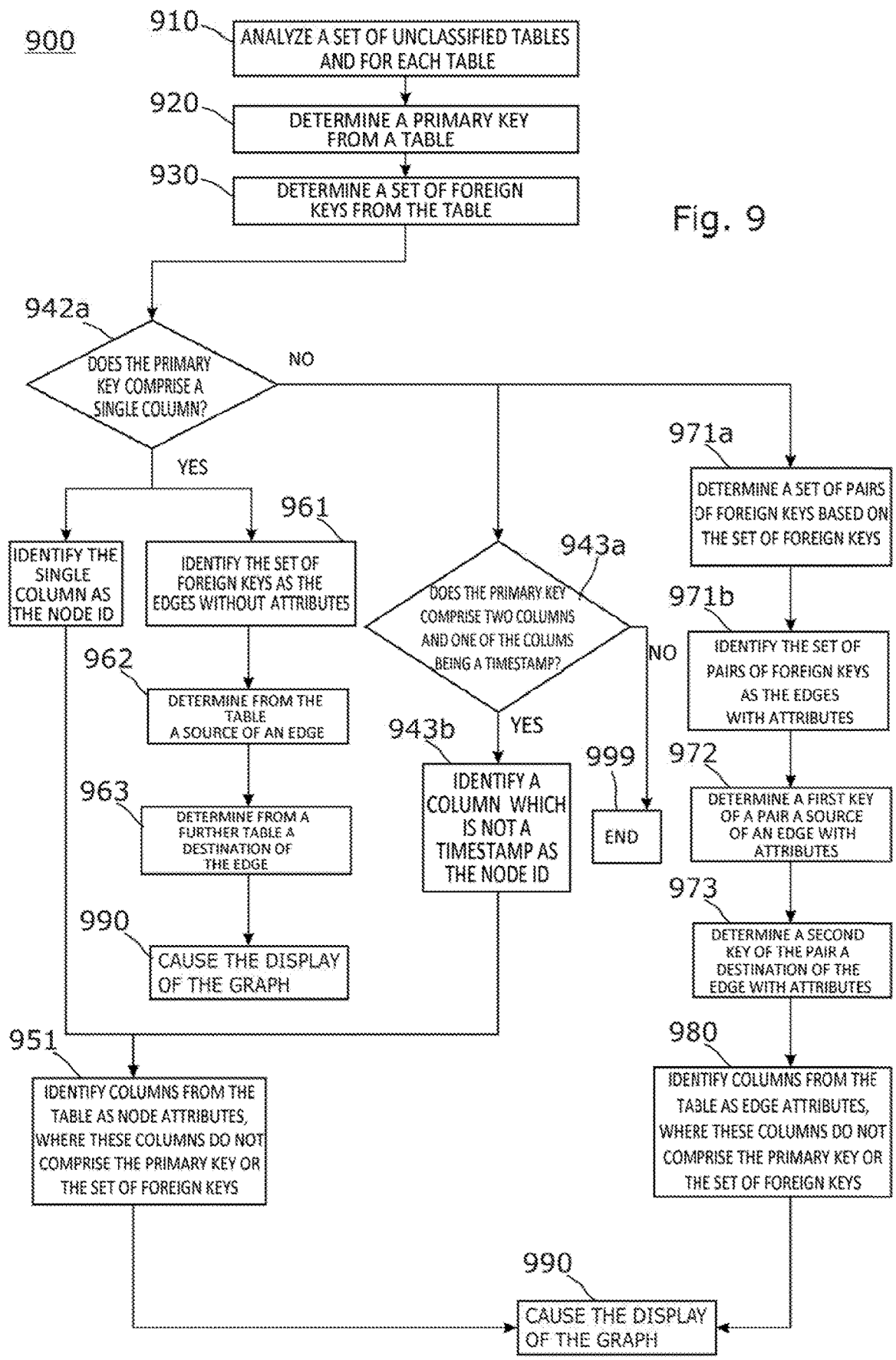
FIG. 9 is a flowchart of example blocks for inferring a graph topology.

FIG. 9 shows an example of a block diagram 900 describing a method for inferring a graph topology. The block diagram 900 starts at block 910 that can be carried out by executing instructions 110 to analyze a set of unclassified tables associated with a graph topology, and for each table of the set, the instructions 120 can implement block 920 to determine a primary key from each of the tables being analyzed. Referring to one of the tables, the primary key can comprise one or more columns of the table. After determining the primary key from the table, a set of foreign keys associated with the table can be determined by executing instructions 130 to carry out block 930. Each foreign key can correspond to a single column from the table being analyzed.

Instructions 341 previously described in FIG. 3 can implement block 942a to determine whether the primary key comprises a single column or not. If the primary key comprises a single column from the table being analyzed, instructions 342 can execute block 942b where the single column of the table comprising the primary key can be identified as the node ID of the table. This table can be classified as a node table.

If block 942a determines that the primary key comprises a single column from the table being analyzed, the set of foreign keys previously determined can be identified as a set of edges without attributes in block 961 by executing instructions 560 and 561 described in FIG. 5. The table processed by executing instructions 560 and 561 to identify edges without attributes can be classified as an edge table. In this respect, a table classified as an edge table can be classified as a node table and vice versa. In order to define the set of edges without attributes, instructions 562 and 563 can implement blocks 962 and 963, respectively. In block 962 the edge table can be determined as a source of an edge without attributes. In block 963 a further table from the set of unclassified tables can be determined as a destination of the edge without attributes. Blocks 962 and 963 can be iteratively executed by the aforementioned instructions in order to process the whole set of foreign keys determined in block 930. Hence, all the edges without attributes that could be inferred from the edge table and associated further tables can be identified.

Stepping back to block 942a, if the primary key does not comprise a single column of the table being analyzed, the diagram 900 may move to block 943a implemented by instructions 341 and block 971a implemented by instructions 670. In block 943a, the primary key can be analyzed to determine whether the primary key comprises two columns of the table and one of the columns comprises a timestamp variable. If the check performed in block 943a is positive, the column which does not comprise the timestamp variable is identified as the node ID of the table by executing instructions 343 in block 943b. Hence, this table can be classified as a node table after executing the aforementioned instructions. If the check performed in block 943a is negative, the diagram 900 ends in block 999 and nothing can be inferred from the table being analyzed.

Instructions 671 as part of instructions 670 can implement block 971a that can determine a set of pairs of foreign keys based on the set of foreign keys. The set of pairs of foreign keys can be all possible pair combinations of different foreign keys previously determined in block 930, e.g. if the set of foreign keys comprises three foreign keys determined from the table being analyzed in block 930, the set of pairs of foreign keys can comprise six pairs of foreign keys. In another example, the set of pairs of foreign keys can comprise all possible pair combinations of foreign keys determined in block 930. Furthermore, instructions 671 can implement block 971b that can identify the set of pairs of foreign keys determined in previous block 971a as the edges with attributes. Hence, for the mentioned particular example, block 971b could determine a total of six edges with attributes for the graph topology. This table can be classified as an edge table after executing the aforementioned instructions.

Instructions 672 may implement block 972 that can determine a first key of a pair of foreign keys of the set of pairs previously determined in block 971b as a source of one of the edges with attributes. Instructions 673 may implement block 973 that can determine a second key from the same pair of foreign keys as a destination of the edge with attributes. The determined edges with attributes according to the present disclosure may not be directed edges. Instructions 781 may implement block 980 that can identify, responsive to the instructions 670 identifying edges with attributes, columns from the edge table as one or more edge attributes where these columns do not comprise the columns of the primary key or the columns of the set of foreign keys.

In block 990 the graph can be displayed by executing instructions 190. The graph can be also transmitted in block 990 to an external remote system or stored in the computing device 100 by executing instructions 190. Block 990 can be performed by taking use of the parameters previously determined along the diagram 900, i.e. the primary key, the set of foreign keys, the node ID, the set of node attributes, the set of edges without attributes, the set of edges with attributes and the set of edge attributes.

Figure 10:
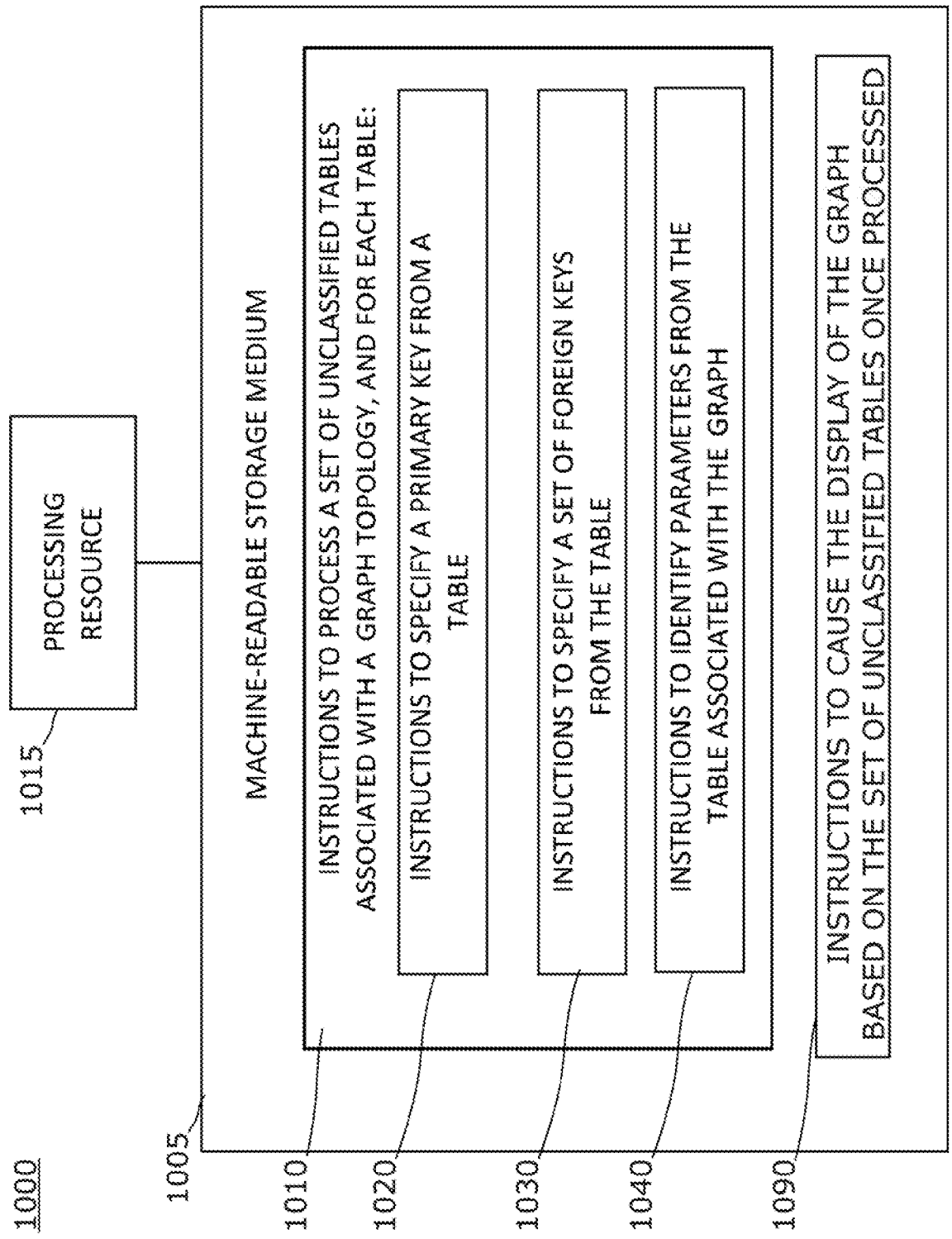
FIG. 10 is a block diagram of an example machine-readable storage medium including instructions to infer a graph topology.

FIG. 10 shows a block diagram 1000 of an example of a machine-readable storage medium 1005 according to an example of the present disclosure for inferring a graph topology. The storage medium 1005 can include instructions executable by a processing resource 1015. In particular, the storage medium 1005 can comprise instructions 1010 to process a set of unclassified tables associated with a graph topology and for each table, the following instructions can be executed: instructions 1020 to specify a primary key from a table, instructions 1030 to specify a set of foreign keys from the table and instructions 1040 to identify parameters from the table associated with the graph. Furthermore, the machine-readable storage medium 1005 can comprise instructions 1090 to infer the graph topology by causing the display of the graph based on the set of unclassified tables once it has been processed by instructions 1010. Instructions 1090 can comprise instructions to transmit, provide and store the inferred graph topology.

Figure 11:
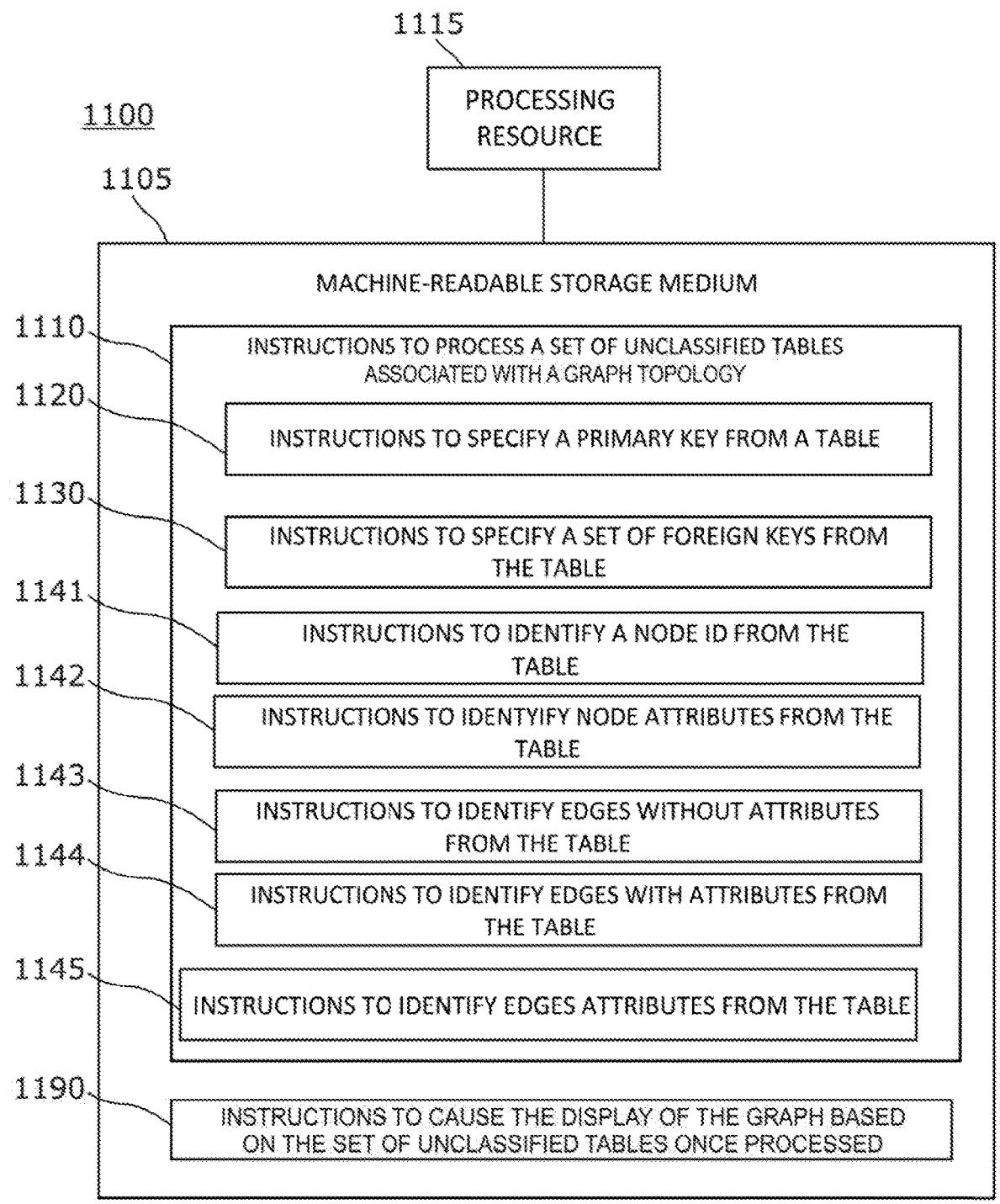
FIG. 11 is a block diagram of an example machine-readable storage medium including instructions to infer a graph topology.

FIG. 11 shows a block diagram 1100 of an example of a machine-readable storage medium 1005 according to an example of the present disclosure for inferring a graph topology. The storage medium 1105 can include instructions executable by a processing resource 1115. In particular, the storage medium 1105 can comprise instructions 1110 to process a set of unclassified tables to infer a graph, an in particular it iteratively executes instructions for every table of the set of tables. These instructions comprise instructions 1120 to specify a primary key from a table from the set of unclassified tables, instructions 1130 to specify a set of foreign keys from the table, instructions 1141 to identify a node ID from the table, instructions 1142 to identify node attributes from the table, instructions 1143 to identify edges without attributes from the table, instructions 1144 to identify edges with attributes from the table and instructions 1145 to identify edges attributes from the table. Furthermore, the storage medium 1105 comprises instructions 1190 to infer the graph topology to cause the display of the graph topology based on the set of unclassified tables once processed. Instructions 1105 can comprise instructions to transmit, provide and store the inferred graph topology.

The sequence of operations described in connection with FIGS. 1 to 11 are examples and are not intended to be limiting. Additional or fewer operations or combinations of operations may be used or may vary without departing from the scope of the disclosed examples. Furthermore, implementations consistent with the disclosed examples may not perform the sequence of operations or instructions in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A computing device for inferring a graph topology, comprising a physical processor that executes machine readable instructions that cause the computing device to:
   process a set of unclassified tables comprising an unordered set of tables of a relational database to generate the graph topology based on a relational schema of the relational database to classify each unclassified table as a node, an edge, or both of the resulting graph topology, and for each table:
   determine a primary key comprising a set of columns of a table being processed;
   determine a set of foreign keys, each foreign key comprising a column of the table being processed;
   identify a parameter based on the table being processed, the primary key and the set of foreign keys, the parameter comprising:
   a node identification;
   a set of node attributes;
   a set of edges without attributes;
   a set of edges with attributes; or
   a set of edge attributes;
   cause the display of the graph topology based on the processed set of unclassified tables;
   responsive to the primary key comprising a single column which does not comprise a time stamp, identify the single column as the node identification; and
   responsive to the primary key comprising two columns and one of the columns comprising the time stamp, identify the column which does not comprise the time stamp as the node identification; and responsive to the node identification being identified, identify a set of columns of the processed table as the set of node attributes, wherein the set of columns of the processed table do not comprise the primary key or the set of foreign keys.

2. The computing device according to claim 1, wherein the physical processor executes machine readable instructions that cause the computing device to:
responsive to the primary key comprising a single column, identify the set of foreign keys as the set of edges without attributes,
wherein for each foreign key:
determine from the processed table a source of an edge without attributes; and
determine from a further table associated with the a set of foreign keys a destination of the edge without attributes.

3. The computing device according to claim 1, wherein the physical processor executes machine readable instructions that cause the computing device to:
responsive to the primary key comprising more than one column:
determine a set of pairs of foreign keys based on the set of foreign keys;
identify the set of pairs of foreign keys as the set of edges with attributes; and
identify additional columns of the processed table as the set of edge attributes, wherein the additional columns do not comprise the primary key or the set of foreign keys,
wherein for each pair of foreign keys:
determine a first key of a pair of foreign keys a source of an edge with attributes; and
determine a second key of the pair of foreign keys a destination of the edge with attributes.

4. A method for inferring a graph topology, the method being implemented by a computing device comprising a physical processor executing machine readable instructions, the method comprising:
analyzing a set of unclassified tables comprising an unordered set of tables of a relational database to generate the graph topology based on a relational schema of the relational database in order to classify each unclassified table as a node, and edge, or both of the graph topology, and for each table:
obtaining a primary key, the primary key representing a set of columns of a table from the set of unclassified tables;
obtaining a set of foreign keys, each foreign key representing a column of the table; and
identifying a parameter based on the table, the primary key and the set of foreign keys, the parameter comprising:
a node identification;
a set of node attributes;
a set of edges without attributes;
a set of edges with attributes; or
a set of edge attributes;
identifying the node identification based on the primary key, wherein the node identification includes a column that does not comprise a time stamp;
responsive to node identification being identified, identifying a set of columns of the unclassified table as the set of node attributes, wherein the set of columns of the unclassified table do not comprise the primary key or the set of foreign keys; and
causing the display of the graph topology based on the analyzed set of unclassified tables.

5. The method of claim 4, further comprising:
responsive to the primary key comprising a single column which does not comprise the time stamp, identifying the single column as the node identification; and
responsive to the primary key comprising two columns and one of the columns comprising the time stamp, identifying the column which does not comprise the time stamp as the node identification.

6. The method of claim 4, further comprising:
responsive to the primary key comprising a single column, identifying the set of foreign keys as the set of edges without attributes,
wherein for each foreign key:
determining from the unclassified table a source of an edge without attributes; and
determining from a further table associated with the set of foreign keys a destination of the edge without attributes.

7. The method of claim 4, further comprising:
responsive to the primary key comprising more than one column:
determining a set of pairs of foreign keys based on the set of foreign keys;
identifying the set of pairs of foreign keys as the set of edges with attributes; and
identifying additional columns of the table as the set of edge attributes, wherein the additional columns of the table do not comprise the primary key or the set of foreign keys,
wherein for each pair of foreign keys:
determining a first key of a pair of foreign keys a source of an edge with attributes; and
determining a second key of the pair of foreign keys a destination of the edge with attributes.

8. A non-transitory machine-readable storage medium for inferring a graph topology, encoded with machine-readable instructions executable by the physical processor that cause the computing device to:
during the processing of a set of unclassified tables comprising an unordered set of tables of a relational database to generate the graph topology based on a relational schema of the relational database in order to classify each unclassified table as a node, an edge, or both of the resulting graph topology and for each table:
specify a primary key based on a set of columns of a table;
specify a set of foreign keys, each key comprising a column of the table; and
identify a parameter based on the unclassified table, the primary key and the set of foreign keys, the parameter comprising:
a node identification;
a set of node attributes;
a set of edges without attributes;
a set of edges with attributes; or
a set of edge attributes;
identify the node identification based on the primary key, wherein the node identification includes a column that does not comprise a time stamp;
responsive to node identification being identified, identify a set of columns of the unclassified table as the set of node attributes, wherein the set of columns of the unclassified table do not comprise the primary key or the set of foreign keys; and cause the display of the graph topology based on the processed set of unclassified tables.

9. The non-transitory machine-readable storage medium of claim 8, further comprising machine readable instructions that cause the computing device to:
    responsive to the primary key comprising a single column which does not comprise a time stamp, identify the single column as the node identification; and
    responsive to the primary key comprising two columns and one of the columns comprising the time stamp, identify the column which does not comprise the time stamp as the node identification.

10. The non-transitory machine-readable storage medium of claim 8, further comprising machine readable instructions that cause the computing device to:
    responsive to the primary key comprising a single column, identify the set of foreign keys as the set of edges without attributes,
    wherein for each foreign key:
        determine from the unclassified table a source of an edge without attributes; and
        determine from a further table related to the foreign key a destination of the edge without attributes.

11. The non-transitory machine-readable storage medium of claim 8, further comprising machine readable instructions that cause the computing device to:
    responsive to the primary key comprising more than one column:
determine a set of pairs of foreign keys based on the set of foreign keys;
    identify the set of pairs of foreign keys as the set of edges with attributes; and
    identify additional columns of the table as the set of edge attributes,
    wherein the additional columns of the table do not comprise the primary key or the set of foreign keys,
    wherein for each pair of foreign keys:
        determine a first key of a pair of foreign keys a source of an edge with attributes; and
        determine a second key of the pair of foreign keys a destination of the edge with attributes.

\* \* \* \* \*